Patented Nov. 12, 1929

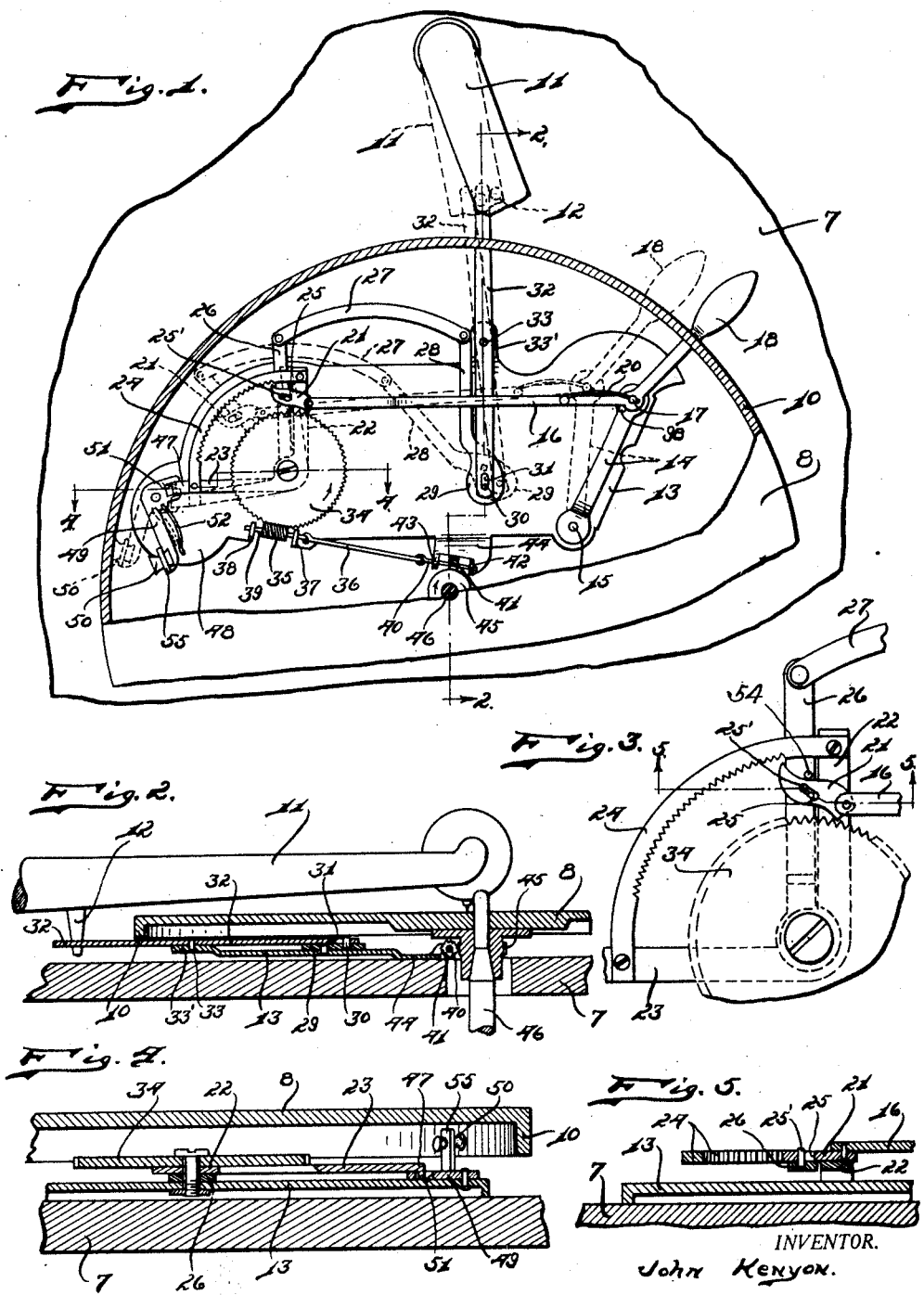

1,735,251

UNITED STATES PATENT OFFICE

JOHN KENYON, OF DETROIT, MICHIGAN

AUTOMATIC TURNTABLE STOP

Application filed May 7, 1928. Serial No. 275,569.

My invention relates to a new and useful improvement in an automatic turn table stop, and has for its object the provision of a turn table stop of this class which will be simple in sructure, economical of manufacture and highly efficient in use.

Another object of the invention is the provision of a turn table stop of this class in which a positive setting of the brake may be effected at predetermined periods of rotation of the turn table.

Another object of the invention is the provision of an automatic stop of this class having an arm for automatically operating the brake and provided with a manually operable arm for operating the brake.

Another object of the invention is the provision of a stop of this class in which a minimum amount of movement of the operating arm will effect an operation of the stop.

Other objects will appear hereinafter.

The invention consists in the combination and arrangement of parts hereinafter described and claimed.
The invention will be best understood by a reference to the accompanying drawings which form a part of this specification and in which, Fig. 1 is a top plan view of the invention showing it applied.

Fig. 2 is a fragmentary sectional view taken on line 2—2 of Fig. 1.

Fig. 3 is an enlarged fragmentary plan view of the invention.
Fig. 4 is a fragmentary sectional view taken on line 4—4 of Fig. 1.

Fig. 5 is a fragmentary sectional view taken on line 5—5 of Fig. 3.

In the drawings I have illustrated the invention applied to a phonograph 7 having a turn table 8 mounted thereon, and provided with a downwardly directed flange 10. A tone arm 11 carries a downwardly projecting engagement finger 12.
The invention is mounted on a plate 13 and comprises an arm 14 which is pivotally mounted at 15 on the plate 13. Projecting upwardly from the opposite end of the arm 14 is a pin 17 which extends through one end of the bar 16 which is provided with the angularly turned end 18 to provide a manually operable lever for operating the mechanism. Secured at one end to the bar 16 and projected at its other end through the pin 14 is a leaf spring 20 which normally tends to retain the members 14 and 16 in the position shown in full lines in Fig. 1. Pivotally connected to the opposite end of the bar 16 is a dog 21 in which is formed a slot 25 engaging in which is a pin 25' which projects upwardly from the lever 26. A bell crank comprising the arms 22 and 23 is rockably mounted on the plate 13, the outer end of the arm 22 being connected to the arm 23 by the arcuate segment 24 which is provided with ratchet teeth on its inner edge. The lever 26 is connected by the arcuate member 27 to a lever 28 which is provided at one end with the enlargement 29, this lever 28 being pivotally connected, intermediate its ends, to the plate 13. Projecting upwardly from the enlarged part 29 is a pin 30 extended through an elongated slot 31 formed in one end of the lever 32, this lever 32 being pivotally mounted on the lug 33' formed on the plate 13 by the pin 33. Rotatably mounted on the plate 13 is a gear 34 meshing with a worm 35 which is fixedly mounted on the shaft 39 extended through the lugs 37 and 38 which project outwardly from one face of the plate 13. Connected to one end of the shaft 39 is a rod 36 which connects to the shaft 40 which extends through the lugs 42 and 43 formed on the lug 44. Fixedly mounted on the shaft 40, intermediate the lugs 42 and 43, is a gear 41 which meshes with a worm 45 fixedly mounted on the turn table shaft 46.

The arm 23 is extended beyond the arcuate portion 24, this outwardly extending portion 47 engaging in a recess 51 formed in a brake operating arm 49. This arm 49 is pivotally mounted on the lug 48 and projecting upwardly from one end thereof is a lug 55 which carries a braking member 50 adapted to engage the inner surface of the turn table flange 10. A spring 52 is connected at one end to the lug 48 and free at its opposite end to engage the member 49, adjacent its point of pivotal mounting.

Projecting outwardly from one face of the arm 26 is a pin 54 which serves to prevent a rocking of the dog 21 downwardly at its rear end beyond a predetermined distance.

In operation, when the turn table 8 is rotated a sufficient distance to bring the engagement finger 12 and the tone arm 11 into engagement with the lever 32, this lever 32 will be rocked on its pivot into the position shown in dotted lines, thus moving the arm 26 into the position shown in dotted lines and through the pull exerted on the contact 21 by the bar 16, the dog 21 will engage one of the teeth on the arcuate segment 24. This movement is a comparatively slow one, but slightly in advance of the speed of the rotation of the gear 34, and when the movement has ceased, the dog 21 will also rock into engagement with the gear 34, and this gear 34, through the dog 21, will effect a rocking of the bell crank arms 26 and 23 on their pivots, so as to move the outwardly projecting portion 47 downwardly into the dotted line position shown in Fig. 1 and force the brake shoe 50 into engagement with the flange of the turn table. The spring 52 normally tends to retain the member 49 in the position shown in full lines, but when this member is moved so that the spring 52 passes beyond center, this spring will serve to retain the member 49 in the position shown in dotted lines in Fig. 1 and press the brake shoe 50 tightly against the flange 10.

To restore the device to normal position, the lever 18 is rocked from the dotted line position shown in Fig. 1 to the position shown in full lines in Fig. 1. As this movement begins the bar 16 will move into engagement with the pin 98 which projects from the face of the lever 14. As the movement continues, therefore, the bar 16 being rigid as to the bar 14, will, with the bar 14, swing as a unit on the pivot 15, thus causing the end of the bar 16 which is attached to the dog 21 to swing upwardly in an arc. Thus the dog is released from engagement with the teeth of the gear 34 or the teeth on the arcuate member 24, the dog being brought into engagement with the pin 54 which projects outwardly from the face of the lever 26.

It will also be noted that the connection of the bar 16 to the dog 21 is outwardly from the end of the dog which engage the teeth on the gear 34.

There is thus provided an automatic stop in which a short space of time elapses from the time of operating the device until the release of the brake.

The simplicity of the structure of the device is believed evident, as well as the economy with which it can be manufactured.

It will be noted that the lug 44 is downwardly offset at its edge so as to bring the gear 41 as close to the top of the table 7 as possible, as the worm 45 lies just above the surface of the table.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A turn table stop of the class described, adapted for use with a turn table having a flange and means for rotating said turn table, comprising: a gear; means operable by said rotating means for rotating said gear; a rockably mounted brake member for engaging said flange; means for normally retaining said brake member out of engagement with said flange; a rockably mounted tooth-bearing segment adapted, upon rocking in one position, for moving said brake member to braking position; and a rockably mounted dog engageable with the teeth of said gear and said segment for rocking said segment to brake moving position.

2. A turn table stop of the class described, adapted for use with a turn table having a flange and means for rotating said turn table, comprising: a gear; means operable by said rotating means for rotating said gear; a rockably mounted brake member for engaging said flange; means for normally retaining said brake member out of engagement with said flange; a rockably mounted tooth-bearing segment adapted, upon rocking in one position, for moving said brake member to braking position; a rockably mounted dog engageable with the teeth of said gear and said segment for rocking said segment to brake moving position; and means for moving said dog to engaging position.

3. A turn table stop of the class described, adapted for use with a turn table having a flange and means for rotating said turn table, comprising: a gear; means operable by said rotating means for rotating said gear; a rockably mounted brake member for engaging said flange; means for normally retaining said brake member out of engagement with said flange; a rockably mounted tooth-bearing segment adapted, upon rocking in one position, for moving said brake member to braking position; a rockably mounted dog engageable with the teeth of said gear and said segment for rocking said segment to brake moving position; means for moving said dog to engaging position; and means for moving said dog out of engaging position.

4. A turn table stop of the class described adapted for use with a turn table having a flange and rotatable by rotating means, comprising: a gear; means rotatable by said rotating means for rotating said gear; said gear being normally rotating upon rotation of said turn table; a rockably mounted brake member adapted, upon movement into one position, for engaging said flange and braking the rotation of said turn table; a rockably mounted tooth-bearing segment engaging said brake member and normally retaining the same in inoperative position and adapted, upon movement into one position, for moving said brake member into operative position; a dog having an elongated slot formed therein; a bar pivotally connected to one end of said dog; means for moving said dog into engagement with the teeth of said segment; means for moving said dog into engagement with the teeth of said gear subsequent to engagement with the teeth of said segment; and means for releasing said dog from engagement with said teeth.

In testimony whereof I have signed the foregoing specification.

JOHN KENYON.